Figure 1:
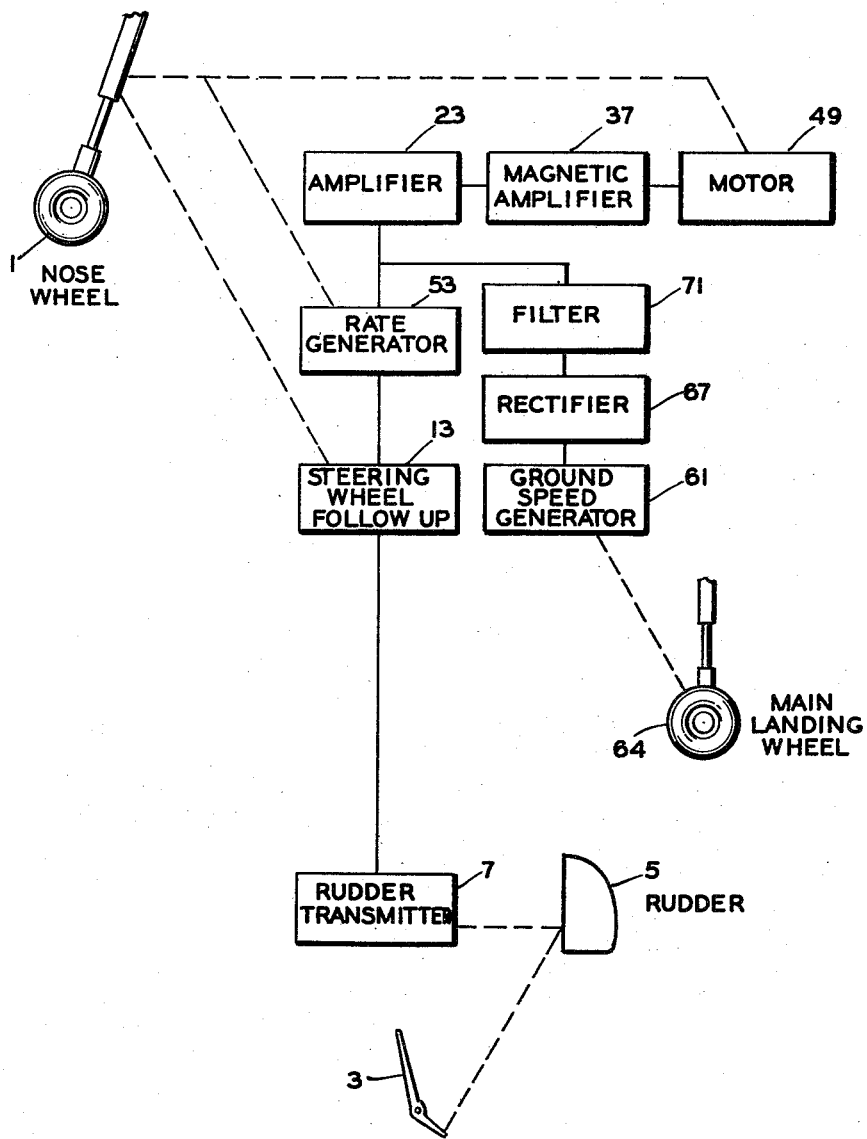

Nov. 26, 1957  A. W. BLANCHARD ET AL  2,814,452
AIRCRAFT STEERING CONTROL SYSTEM
Filed Oct. 26, 1950  2 Sheets-Sheet 1

INVENTORS
ALLEN W. BLANCHARD
DIONISIOS SABALOS
BY *S H Hartz*
ATTORNEY

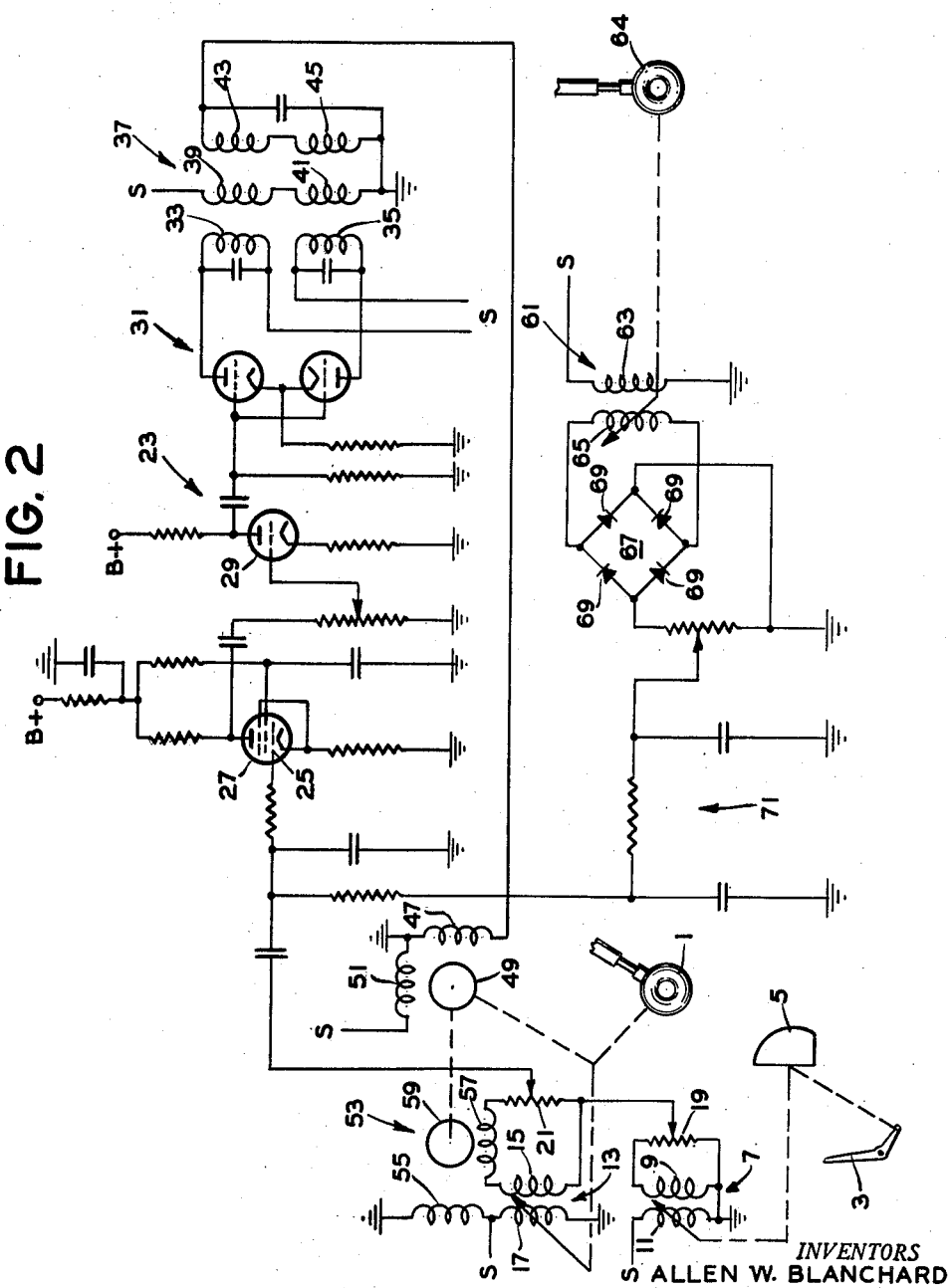

United States Patent Office 2,814,452
Patented Nov. 26, 1957

2,814,452

AIRCRAFT STEERING CONTROL SYSTEM

Allen W. Blanchard, Allendale, N. J., and Dionisios Sabalos, Astoria, N. Y., assignors to Bendix Aviation Corporation, Teterboro, N. J., a corporation of Delaware Application October 26, 1950, Serial No. 192,295

3 Claims. (Cl. 244—50)

The invention relates to control systems, and more particularly to a control system in which the output of the system may be varied relative to the input by a changing condition. The system is especially adapted for steering a landing wheel of a craft.

Aircraft moving on the ground at relatively high speeds may be controlled by the rudder, but at low speeds, rudder control is ineffective. Some craft are provided with steerable wheels mechanically connected to the rudder control to steer the craft. When the craft is moving at high speed, the steerable wheel is displaced angularly by the rudder control and the craft may ground loop and the pilot may lose control of the craft.

One object of the present invention is to control a craft moving on the ground at high speed by the rudder alone, and then gradually relinquish control automatically to the steerable wheel as the craft decreases speed.

Another object is to vary response of the steerable wheel to movement of the rudder control as a function of craft speed.

A further object is to vary response of the steerable wheel to movement of the rudder control inversely to the speed of the craft.

Another object is to provide a control system in which response of a controlled member to a controlling member varies according to a changing condition.

The foregoing and other objects and advantages of the invention will appear more fully hereinafter from a consideration of the detailed description which follows, taken together with the accompanying drawings wherein one embodiment of the invention is illustrated. It is to be expressly understood, however, that the drawings are for the purposes of illustration and description only, and are not to be construed as defining the limits of the invention.

The invention contemplates a control system including a controlling member and a member controlled thereby, with means for changing response of the controlled member to the controlling member as a function of a changing condition.

In the drawings, Figure 1 is a block diagram showing a control system constructed according to the invention and controlling the steerable wheel of an aircraft; and Figure 2 is a schematic wiring diagram showing the control system of Figure 1.

Referring now to the drawings for a more detailed description of the novel control system of the present invention, the control system is shown in the drawings as controlling a steerable wheel 1 of an aircraft in response to movement of a controller 3 which may be operated manually or by an automatic pilot controlled by compass heading or radio guidance signals, or in any other suitable manner. A rudder 5 is drivably connected to controller 3 for angular displacement about a vertical axis.

An inductive transmitter device 7 has a single phase stator winding 9 and a single phase rotor winding 11 drivably connected to the rudder so that the angular displacement of the rotor winding relative to the stator winding provides signals corresponding to angular displacement of the rudder from trim position. An inductive follow-up device 13 has a stator winding 15 and a rotor winding 17 drivably connected to the steerable wheel so that angular displacement of the rotor winding relative to the stator winding provides signals corresponding to angular displacement of the steerable wheel from straight ahead position. Rotor windings 11, 17 may be energized from an alternating power source S.

Potentiometers 19, 21 are connected in series with one another and across stator windings 9, 15 of inductive devices 7, 13, respectively, to vary the sensitivity of the transmitter and follow-up devices. The error signals developed by the transmitter and follow-up devices are applied to the grid 25 of the input stage 27 of an amplifier 23. The amplifier includes, in addition to the input stage 27, a secondary stage 29, and a discriminator 31 at the output to determine the phase of the signal. The output of the amplifier is impressed on the saturating windings 33, 35 of a magnetic amplifier 37. The primary windings 39, 41 of magnetic amplifier 37 are connected in series aiding relation to alternating power source S, and secondary windings 43, 45 oppose one another and are connected in series with the variable phase winding 47 of a two-phase motor 49 drivingly connected to steerable wheel 1 and rotor winding 17 of follow-up device 13. The fixed phase winding 51 of motor 49 is connected to alternating power source S.

A rate generator 53, which may be of the kind shown and described in Riggs Patent No. 2,115,086, issued April 26, 1938, has a pair of stator windings 55, 57 disposed at right angles to one another. Stator winding 55 is connected to alternating power source S and stator winding 57 is connected in series with potentiometer 21 and stator winding 15 of follow-up device 13. A squirrel cage rotor 59 is drivably connected to motor 49 and provides a rate signal in stator winding 57 proportional to motor speed, as described in the above-mentioned patent. The rate signal is applied to the input stage 27 of amplifier 23 with the error signal from transmitter device 7 and follow-up device 13.

When rotor winding 11 of rudder transmitter device 7 is displaced angularly relative to stator winding 9 by movement of the rudder controller, an error signal, corresponding to relative displacement of the rotor windings of the transmitter and follow-up devices, is applied to amplifier 23 and the output of the amplifier controls motor 49, which drives rotor winding 17 of follow-up device 13 to null position. With the arrangement described, angular displacement of the steerable wheel corresponds to angular displacement of the rudder.

To gradually decrease response of the steerable wheel to movement of the rudder controller as the speed of the craft increases, an alternating power generator or transmitter device 61 has a stator winding 63 connected to alternating power source S and a rotor winding 65 driven by a main landing wheel 64 or at a speed proportional to the air speed of the craft, as shown in co-pending application Serial No. 193,928, filed November 3, 1950, by Allen W. Blanchard, now Patent Number 2,762,007. Rotor winding 65 is connected across a rectifying bridge circuit 67 including a rectifier device 69 in each arm of the bridge. The rectified voltage from the bridge is filtered by an R. C. filter 71 and then applied as a negative bias to grid 25 of the input stage 27 of amplifier 23 to vary the sensitivity of the amplifier.

When the craft is moving slowly, only a small bias is impressed on the input of amplifier 23 and the amplifier is relatively sensitive so that substantial relative angular displacement of steerable wheel 1 occurs with small angular displacement of the rudder controller. As the speed of the craft gradually increases, the sensitivity of the amplifier decreases because of the negative bias applied to the input stage, and angular displacement of the steerable wheel in response to movement of the rudder controller gradually decreases, until, at relatively high speeds, the amplifier is biased to cut-off and the controller is substantially ineffective to operate the steerable wheel.

In the arrangement described, response of the steerable wheel to movement of the rudder controller is a function of craft speed and angular displacement of the steerable wheel to rudder controller movement varies inversely to craft speed. The craft, when moving at high speed on the ground, may be controlled by the rudder alone, and as the speed of the craft decreases, control of the craft is relinquished by the rudder to the steerable wheel.

Although the control system of the present invention has been described in connection with controlling relative movement of a rudder and steerable wheel of aircraft in response to rudder controller movement, it should be understood that the system may be used to vary response of a controlled member to a controlling member as a function of a changing condition.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In an aircraft, in combination, a rudder, controller means for operating said rudder, a steerable wheel responsive to operation of said rudder, and means to vary the response of said wheel to said rudder and to vary its movement relative to movement of said rudder as an inverse function of craft speed.

2. In a device of the kind described adapted for use in a craft including a rudder and a steerable wheel, means for operating said rudder, a transmitter device actuated by said rudder for providing signals corresponding to angular displacement of said rudder, a follow-up device actuated by said wheel for providing signals corresponding to angular displacement of said wheel, an amplifier connected for receiving the signals from said transmitter and follow-up devices, means drivably connected to said wheel and responsive to the output of said amplifier to drive said follow-up device to null position, a transmitter device for providing signals corresponding to speed of the craft, and means for applying said speed signals to said amplifier to vary the sensitivity thereof, whereby the response of said wheel to said operating means varies as a function of craft speed.

3. In a device of the kind described adapted for use in a craft including a rudder, a steerable wheel and a main landing wheel, means for operating said rudder, a transmitter device connected to provide signals corresponding to angular displacement of said rudder, a follow-up device connected to provide signals corresponding to angular displacement of said steerable wheel, an amplifier for receiving the signals from said transmitter and follow-up devices, means drivably connected to said steerable wheel and responsive to the output of said amplifier to drive said follow-up device to null position, a transmitter device driven by the main landing wheel to provide signals corresponding to ground speed of the craft, means for applying said ground speed signals to said amplifier to vary the sensitivity thereof, whereby the response of said wheel to said operating means varies as a function of craft speed.

References Cited in the file of this patent

UNITED STATES PATENTS

| | | |
|---|---|---|
| 2,014,965 | Fischel | Sept. 17, 1935 |
| 2,080,581 | Smith | May 18, 1937 |
| 2,340,524 | Fischel et al. | Feb. 1, 1944 |
| 2,387,795 | Isserstedt | Oct. 30, 1945 |
| 2,416,097 | Hansen et al. | Feb. 18, 1947 |
| 2,457,508 | Todd | Dec. 28, 1948 |
| 2,501,327 | Good | Mar. 21, 1950 |
| 2,532,936 | Peterson | Dec. 5, 1950 |
| 2,571,106 | Brannin | Oct. 16, 1951 |
| 2,612,331 | Frazier et al. | Sept. 30, 1952 |